(12) United States Patent
Korikawa

(10) Patent No.: US 7,644,420 B2  
(45) Date of Patent: Jan. 5, 2010

(54) ELECTRONIC UNIT LOADING MECHANISM AND DISK ARRAY DEVICE

(75) Inventor: Masayuki Korikawa, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 359 days.

(21) Appl. No.: 11/079,077

(22) Filed: Mar. 15, 2005

(65) Prior Publication Data
US 2006/0130085 A1 Jun. 15, 2006

(30) Foreign Application Priority Data
Dec. 14, 2004 (JP) ............................. 2004-361789

(51) Int. Cl.
*G11B 17/04* (2006.01)
(52) U.S. Cl. .................................... 720/657
(58) Field of Classification Search ............. 360/97.01, 360/657; 720/657; 369/30.39, 30.38, 30.4, 369/30.61, 30.49; 361/685, 687
See application file for complete search history.

(56) References Cited

U.S. PATENT DOCUMENTS

| | | | | |
|---|---|---|---|---|
| 4,941,841 A | * | 7/1990 | Darden et al. | 361/685 |
| 5,212,681 A | * | 5/1993 | Bock et al. | 720/654 |
| 7,257,827 B2 | * | 8/2007 | Lee | 720/653 |
| 2002/0012236 A1 | * | 1/2002 | Dimarco | 361/796 |
| 2002/0097556 A1 | * | 7/2002 | Lee | 361/685 |
| 2003/0063436 A1 | * | 4/2003 | Cox et al. | 361/685 |
| 2003/0099094 A1 | * | 5/2003 | Coles et al. | 361/726 |

FOREIGN PATENT DOCUMENTS

| | | |
|---|---|---|
| JP | 7-050493 | 2/1995 |
| JP | 10-303579 | 11/1998 |
| JP | 11-185345 | 7/1999 |
| JP | 2003-36669 | 2/2003 |

OTHER PUBLICATIONS

Korean Office Action mailed May 25, 2006 of Application No. 10-2005-0025934.
Communication mailed from the Japanese Patent Office on Mar. 24, 2009 in the related Japanese patent application No. 2004-361789.

* cited by examiner

*Primary Examiner*—Mark Blouin
(74) *Attorney, Agent, or Firm*—Staas & Halsey

(57) ABSTRACT

In an electronic unit loading mechanism, an electronic unit is attachable to or detachable from an electronic unit loading base which is retractable to a housing. The electronic unit loading mechanism comprises a main part fixed to the loading base and a holding part holding the electronic unit. The holding part is vertically movable to the main part between a taken-out position and a loaded position, wherein the holding part at the taken-out position is taken out from the main part so that the electronic unit is attached to or detached from the loading base, and the holding part at the loaded position is contained in the main part so that the electronic unit is loaded to the loading base.

19 Claims, 13 Drawing Sheets

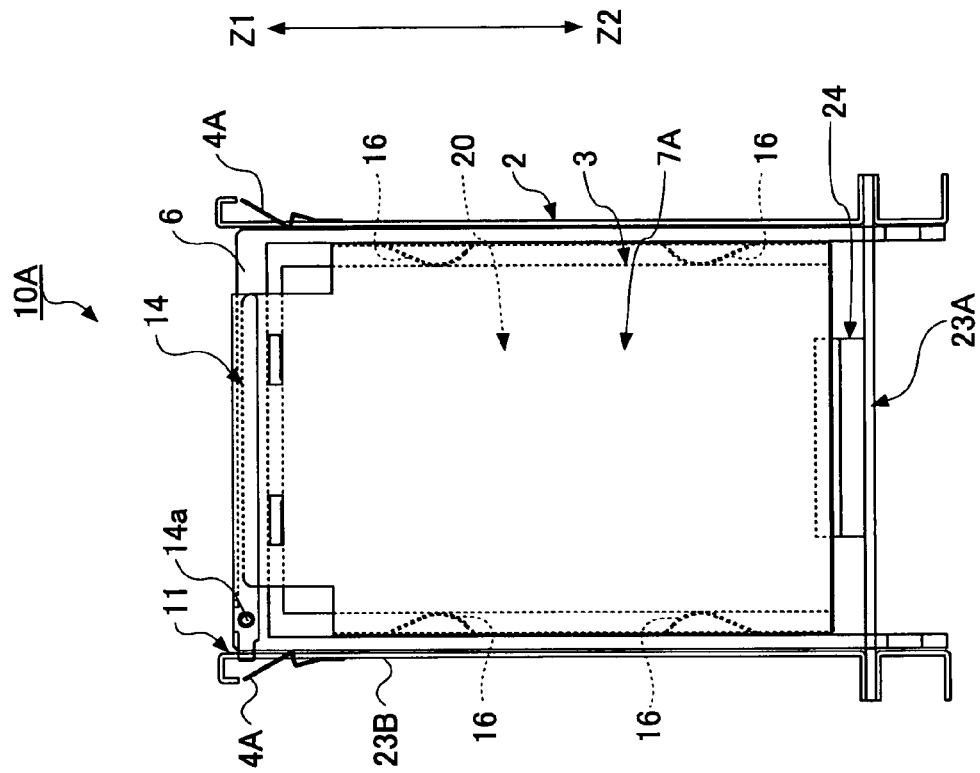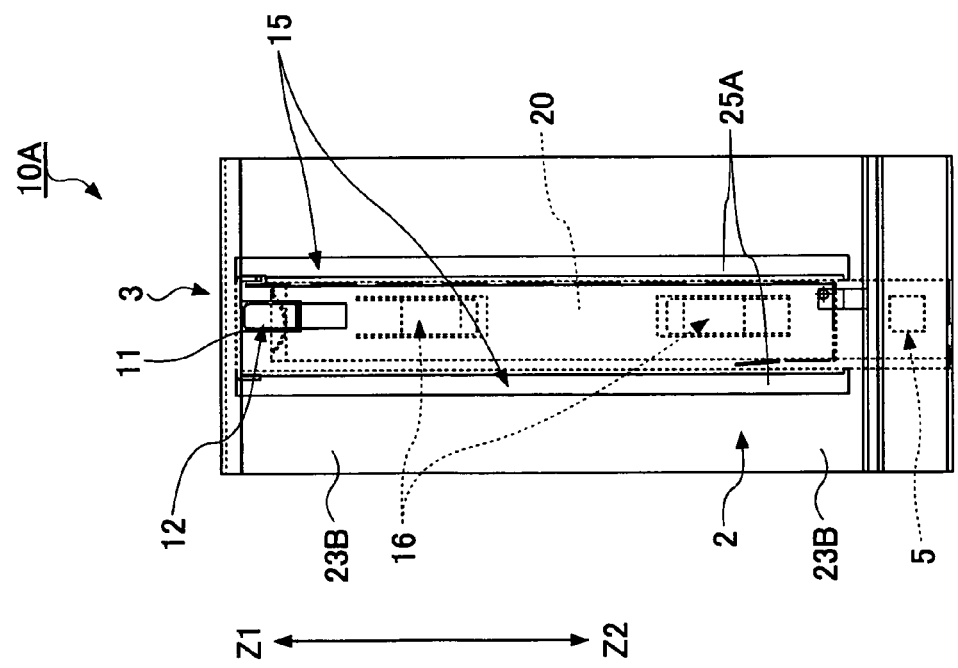

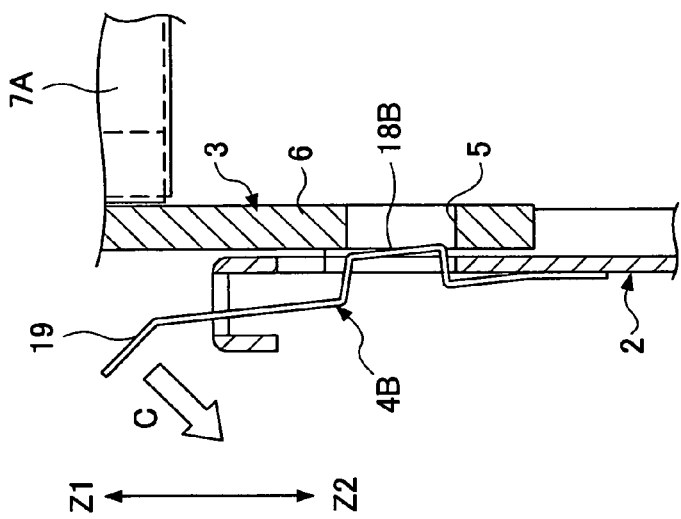
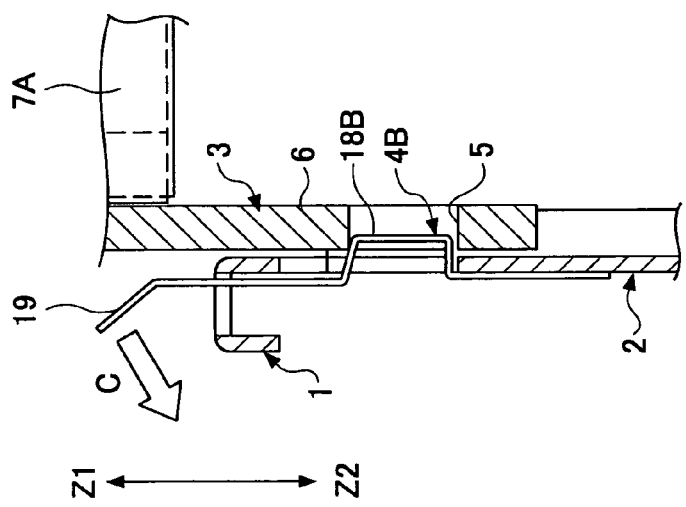
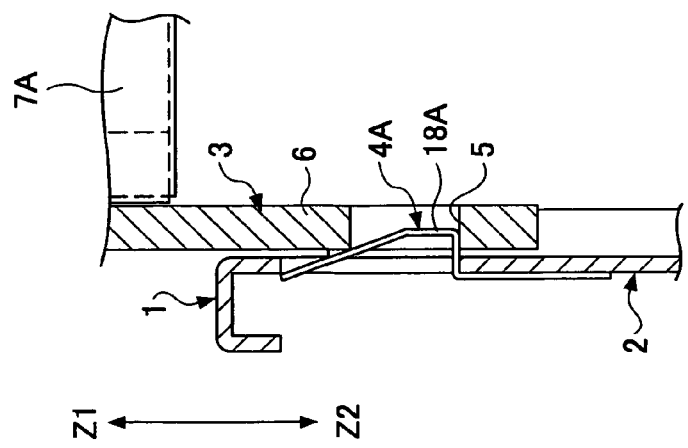

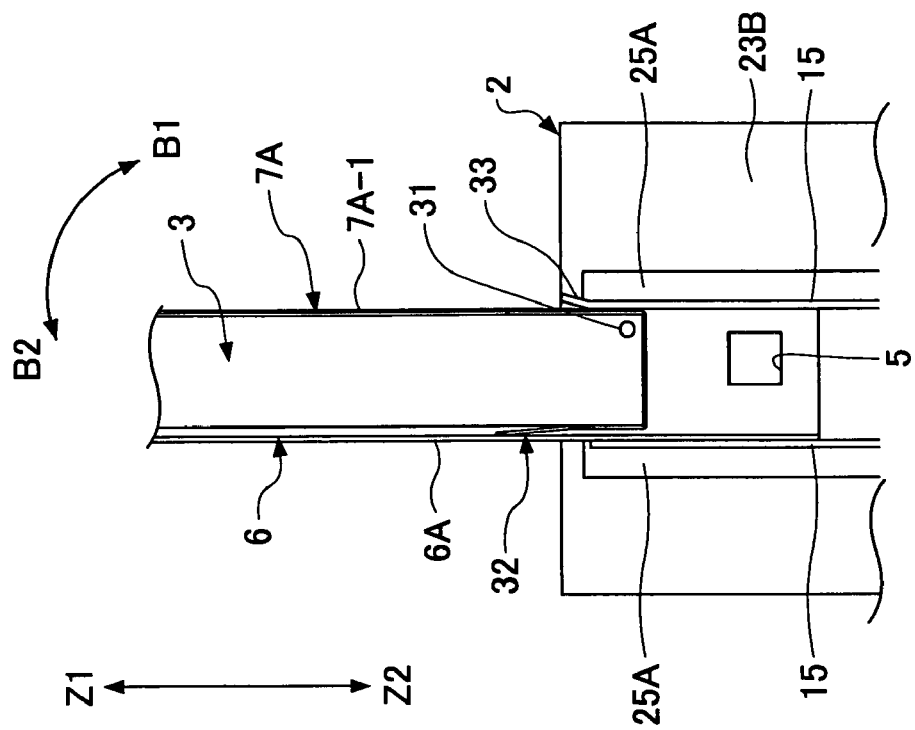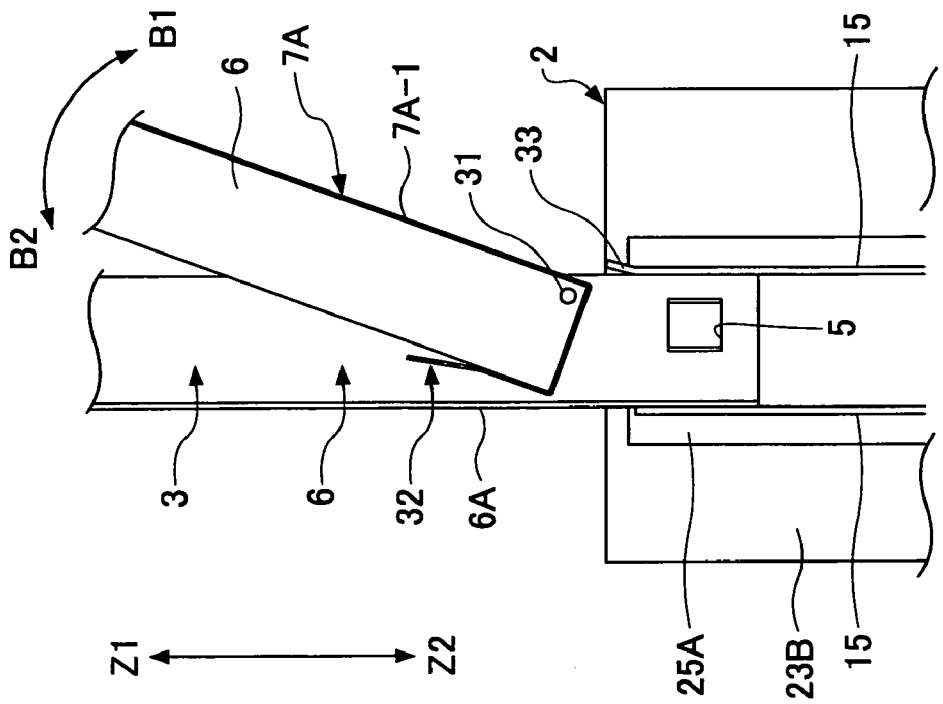

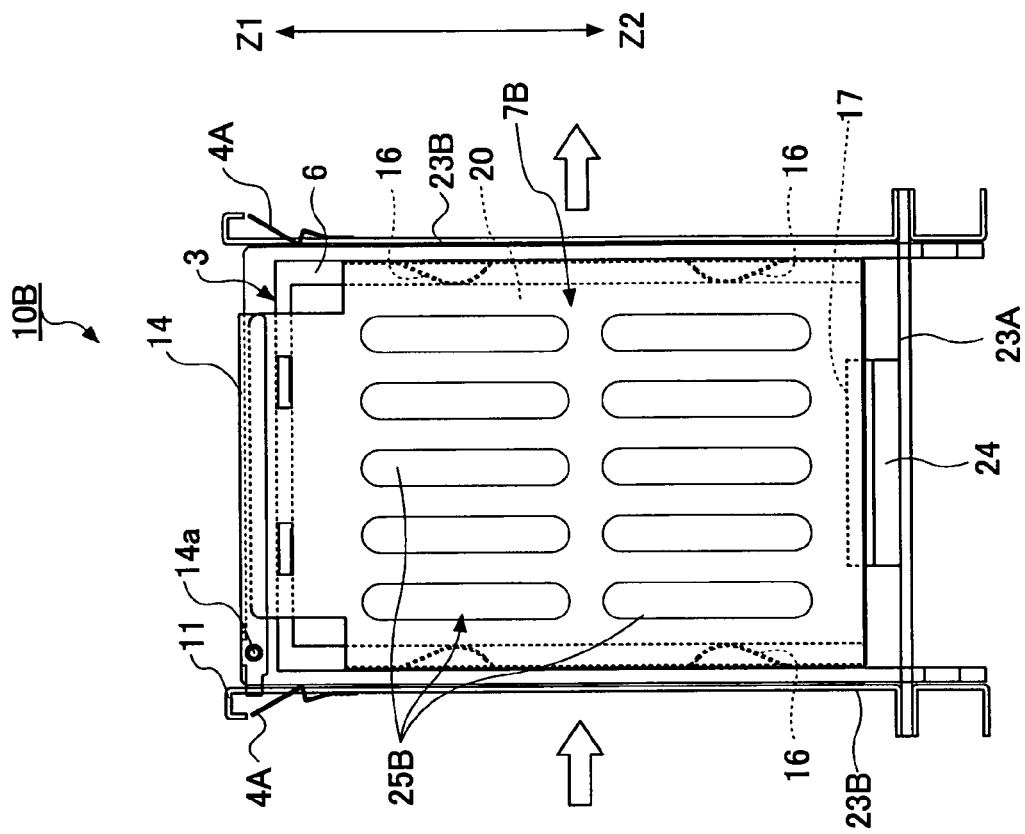
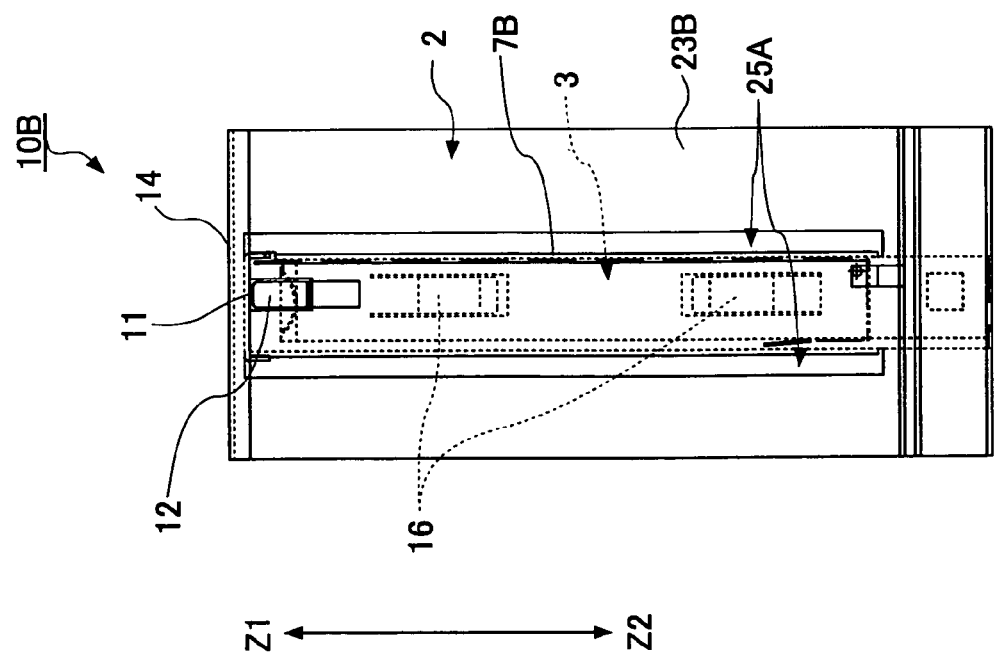

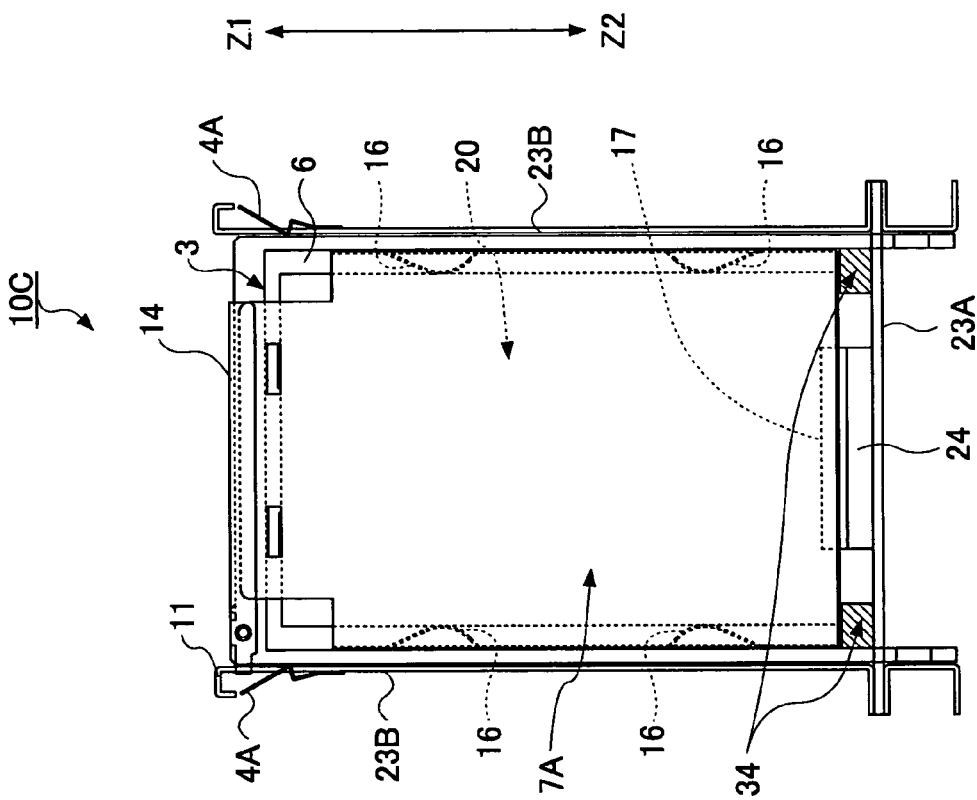
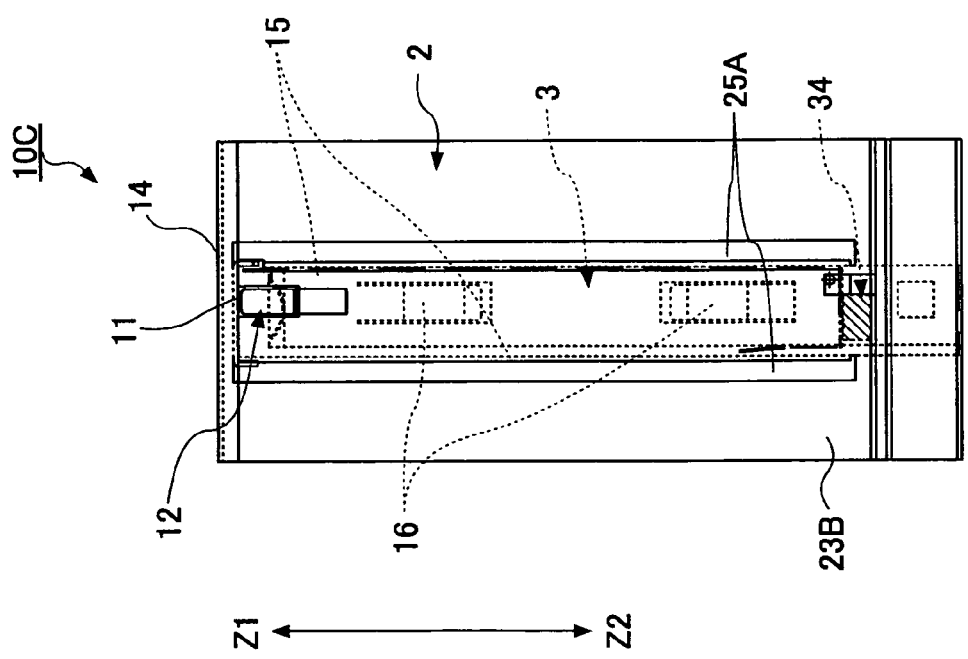

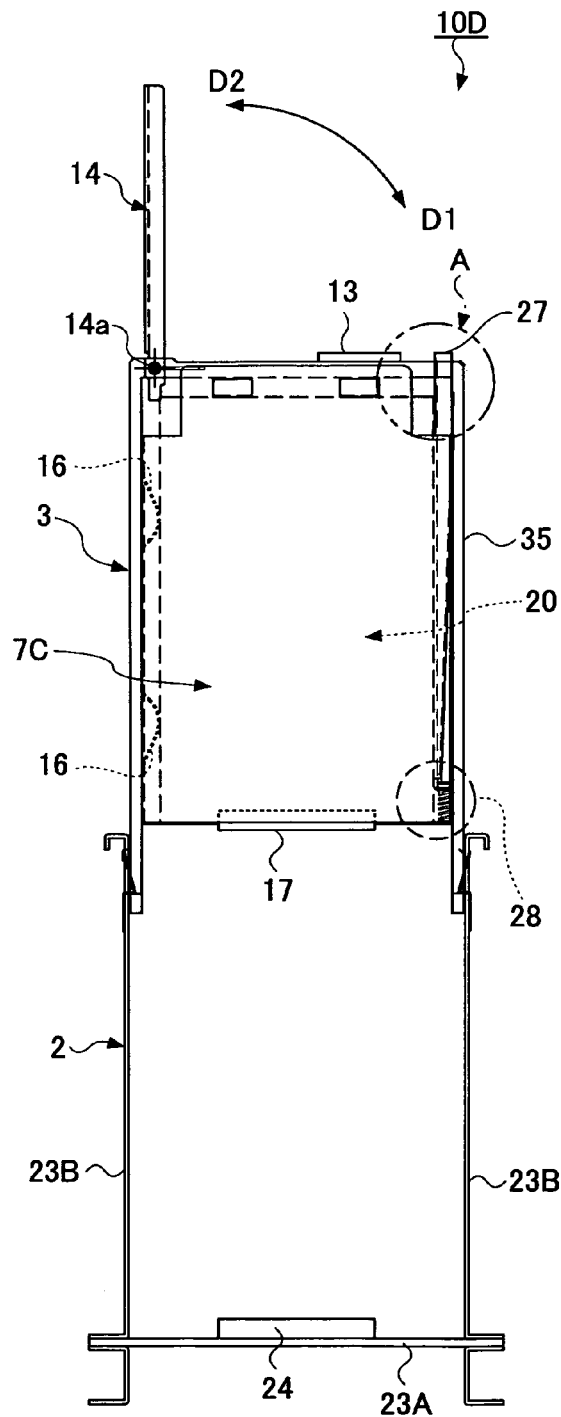
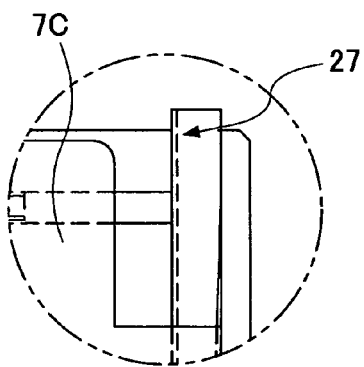
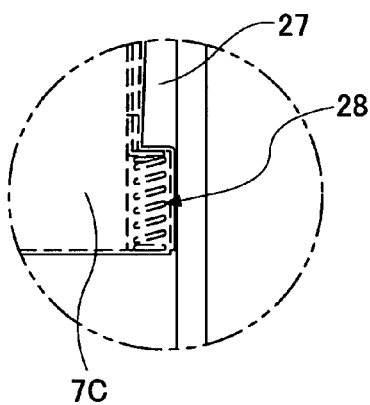
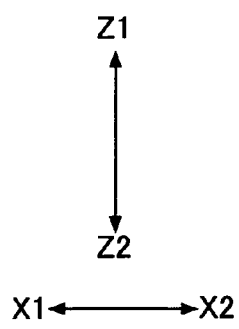
FIG.12A
FIG.12B
FIG.12C

ELECTRONIC UNIT LOADING MECHANISM AND DISK ARRAY DEVICE

CROSS-REFERENCE TO RELATED APPLICATIONS

This application is based upon and claims the benefit of priority of Japanese Patent Application No. 2004-361789, filed on Dec. 14, 2004, the entire contents of which are herein incorporated by reference.

BACKGROUND OF THE INVENTION

1. Field of The Invention

The present invention generally relates to a loading mechanism of electronic units and a disk array device, and more particularly to an electronic unit loading mechanism and a disk array device in which a plurality of electronic units (hard disk drives) are loaded to the electronic unit loading base.

2. Description of The Related Art

In recent years, there has been proposed the disk array device in which the plurality of hard disk drives (HDD) are loaded, in order to realize the external storage that has a high speed and a large capacity with high reliability. See Japanese Laid-Open Patent Application No. 07-050493, for example.

In the case of the disk array device, if the need for the maintenance arises, the operating condition of the entire disk array device is maintained and only the hard disk drive which requires the maintenance is exchanged. In the composition wherein the hard disk drive can easily be detached from or attached to the disk array device, there is a possibility that the hard disk drive may be detached or attached erroneously during the recording/reproducing operation, and the disk array device may be damaged in such a case.

For this reason, the disk array device is usually configured to have the composition wherein the hard disk drives are accommodated in the device main part (housing) of the disk array device on the normal occasion (except the time of the maintenance).

FIG. 1 is a perspective diagram showing the composition of the disk array device 100 disclosed in Japanese Laid-Open Patent Application No. 07-050493. FIG. 2 is a perspective diagram showing the composition of the HDD assembly which is loaded to the disk array device 100.

The holder 139 is provided in the HDD 138, and the lever 141 which can be rotated in the direction of the arrow A in FIG. 2 is provided on the front face of the holder 139. Hereinafter, the HDD 138 and the holder 139 are collectively referred to as the electronic unit 110.

The disk array device 100 is configured as the composition in which the plurality of electronic units 110 are loaded in the device main part 135 which is supported by the four rack pillars 142.

The device main part 135 is made to be in conformity with the standard dimensions, and the width thereof (indicated by the arrows Y1 and Y2 in FIG. 1) is made to be equal to 19 inches.

The cage 136 which can contain the plurality of electronic units 110 is formed in the interior of the device main part 135, and the guide rails 140 which guide the attaching and detaching of the electronic unit 110 are formed in the cage 136.

When the electronic unit 110 is detached from or attached to the device main part 135, the lever 141 is pushed down in the front direction indicated by the arrow A, the pushed-down lever 141 is held and the electronic unit 110 is attached to or detached from the device main part 135.

At this time, the electronic unit 110 is guided on the guide rails 140 formed in the device main part 135, and attached to or detached from the cage 136 in the direction indicated by the arrow X2 or X1 in FIG. 1. Thereby, the electronic unit 110 can be easily attached to or detached from the device main part 135.

In recent years, while the storage capacity of the disk array device is increasing, the HDD loaded to the device main part 135 is changed to the 2.5 inch-diameter hard disk drives from the 3.5 inch-diameter hard disk drives. The storage capacity of the 2.5 inch-diameter hard disk drives is almost the same as the storage capacity of the 3.5 inch-diameter hard disk drives, and the former is smaller in size than the latter.

For this reason, the replacement of the composition equipped with 3.5 inch-diameter hard disk drives in the standard-dimension device main part 135 with the composition equipped with 2.5 inch-diameter hard disk drives can raise the storage capacity of the disk array device 100.

As mentioned above, the 2.5 inch-diameter hard disk drives are smaller in size than the 3.5 inch-diameter hard disk drives. However, as shown in FIG. 1, if the method of attachment and detachment in the X1 or X2 direction is used to the device main part 135 similar to the 3.5 inch-diameter hard disk drives, the number of the hard disk drives that can be loaded to the device main part 135 is limited.

For this reason, there is proposed the composition wherein the drawer cage which can be attached to or detached from the device main part 135 in the direction indicated by the arrow X2 or X1 in FIG. 1 is provided, and the electronic units are attached to or detached from the drawer cage in the vertical direction.

Although the composition using the drawer cage can raise the efficiency of loading the electronic units (the 2.5 inch diameter HDD), it is necessary to vertically insert the electronic unit from the upper part of the drawer cage when the electronic unit is accommodated in the drawer cage, and the operator cannot easily view the guide members (equivalent to the guide rails 140 shown in FIG. 1) for the electronic unit.

For this reason, the operation to load the electronic units to the drawer cage is troublesome, and there is the problem in that the operator may perform the loading operation to a wrong loading position or it takes much time to load the electronic unit to the drawer cage.

SUMMARY OF THE INVENTION

An object of the present invention is to provide an improved electronic unit loading mechanism in which the above-mentioned problems are eliminated.

Another object of the present invention is to provide an electronic unit loading mechanism and a disk array device in which the electronic units can be easily attached to or detached from the drawer cage.

In order to achieve the above-mentioned objects, the present invention provides an electronic unit loading mechanism in which an electronic unit is attachable to or detachable from an electronic unit loading base which is retractable to a housing, the electronic unit loading mechanism comprising: a main part fixed to the loading base; and a holding part holding the electronic unit, wherein the holding part is vertically movable to the main part between a taken-out position and a loaded position, wherein the holding part at the taken-out position is taken out from the main part so that the electronic unit is attached to or detached from the loading base, and the holding part at the loaded position is contained in the main part so that the electronic unit is loaded to the loading base.

According to the above-mentioned invention, the holding part can be vertically moved relative to the main part, and can be moved to the taken-out position where the holding part is taken out from the main part. When the holding part is in the taken-out position, the electronic unit is attachable to or detachable from the holding part. The operation which attaches the electronic unit to or detaches the electronic unit from the holding part in the taken-out position is easy to perform when compared with the composition wherein the electronic unit is directly attached to or detached from the electronic unit loading base which is taken out. Thus, it is possible to raise the operability of attaching and detaching of the electronic unit.

The electronic unit loading mechanism of the above-mentioned invention may be configured so that the loading mechanism comprises a movement regulating member which regulates movement of the holding part when the holding part is moved from the loaded position to the taken-out position.

According to the above-mentioned invention, the movement of the holding part is regulated by the movement regulating member when the holding part is further moved toward the taken-out position, and it is possible to prevent the separation of the holding part from the main part.

The electronic unit loading mechanism of the above-mentioned invention may be configured so that the loading mechanism comprises a locking member which locks the electronic unit to the holding part when the electronic unit is loaded to the holding part.

According to the above-mentioned invention, the locking member locks the electronic unit to the holding part when the electronic unit is loaded to the holding part, and it is possible to prevent the rattling from occurring in the holding part. For this reason, it is possible to prevent the malfunction of the electronic unit due to the rattling of the holding part.

The electronic unit loading mechanism of the above-mentioned invention may be configured so that the holding part comprises a frame and a holder, the frame being vertically movable to the main part, the holder being retractable to the frame, and the electronic unit being attachable to or detachable from the holder.

According to the above-mentioned invention, the electronic unit can be attached to or detached from the holder which is taken out from the frame which is moved to the taken-out position, and the operability of attachment or detachment of the electronic unit can be raised further.

Moreover, in order to achieve the above-mentioned objects, the present invention provides a disk array device including a housing, a disk unit loading base retractable to the housing, and a loading mechanism in which disk units are attachable to or detachable from the loading base, the loading mechanism comprising: a main part fixed to the loading base; and a holding part holding the disk units, wherein the holding part is vertically movable to the main part between a taken-out position and a loaded position, wherein the holding part at the taken-out position is taken out from the main part so that the disk units are attached to or detached from the loading base, and the holding part at the loaded position is contained in the main part so that the disk units are loaded into the loading base.

According to the above-mentioned invention, the holding part can be vertically moved relative to the main part, and can be moved to the taken-out position where the holding part is taken out from the hard-disk-drive loading base. When the holding part is in the taken-out position, the hard disk drive is attachable to or detachable from the holding part. The operation which attaches the hard disk drive to or detaches the hard disk drive from the holding part in the taken-out position is easy to perform when compared with the composition wherein the hard disk drive is directly attached to or detached from the hard-disk-drive loading base which is taken out. Thus, it is possible to raise the operability of attaching and detaching of the hard disk drive with respect to the hard-disk-drive loading base.

As described above, according to the present invention, it is possible to raise the operability of attachment or detachment of the electronic unit (hard disk drive) to the electronic unit loading base (hard-disk-drive loading base).

BRIEF DESCRIPTION OF THE DRAWINGS

Other objects, features and advantages of the present invention will be apparent from the following detailed description when read in conjunction with the accompanying drawings.

FIG. 5A and FIG. 5B are diagrams showing the state where the holding part of the loading mechanism of the first preferred embodiment is taken out.

FIG. 7A, FIG. 7B and FIG. 7C are diagrams for explaining the stopper spring which locks the holding part in the taken-out position.

FIG. 8A and FIG. 8B are diagrams for explaining the mechanism which opens and closes the holder to the frame.

FIG. 9A and FIG. 9B are diagrams showing the state where the holding part of the loading mechanism in the second preferred embodiment of the invention is loaded.

FIG. 10A and FIG. 10B are diagrams showing the state where the holding part of the loading mechanism in the third preferred embodiment of the invention is loaded.

FIG. 12A, FIG. 12B, and FIG. 12C are diagrams showing the state where the holding part of the loading mechanism of the fourth preferred embodiment is taken out.

DETAILED DESCRIPTION OF PREFERRED EMBODIMENTS

A description will now be given of the preferred embodiments of the present invention with reference to the accompanying drawings.

Figure 1:
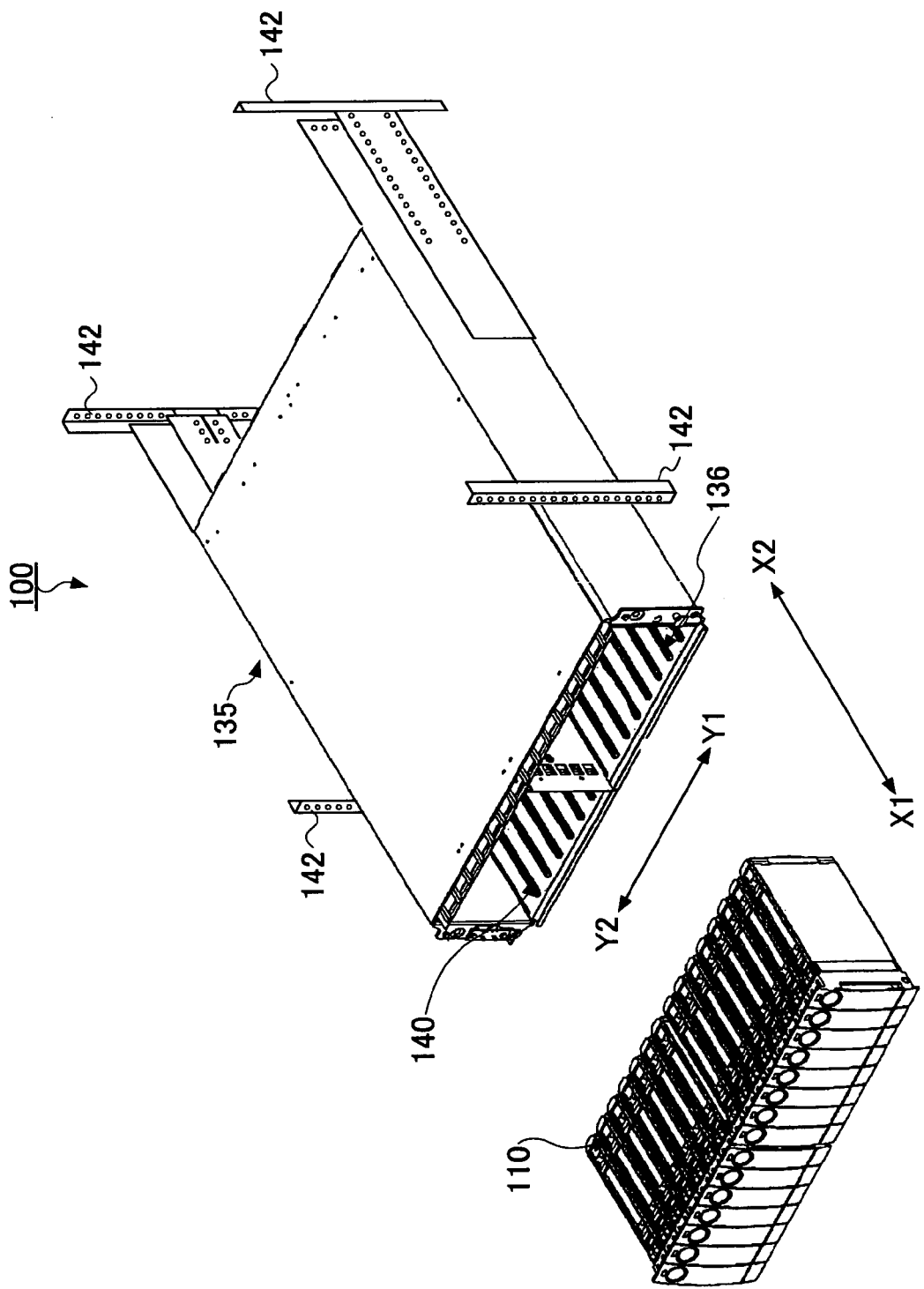
FIG. 1 is a perspective diagram showing the composition of a conventional disk array device.
Figure 2:
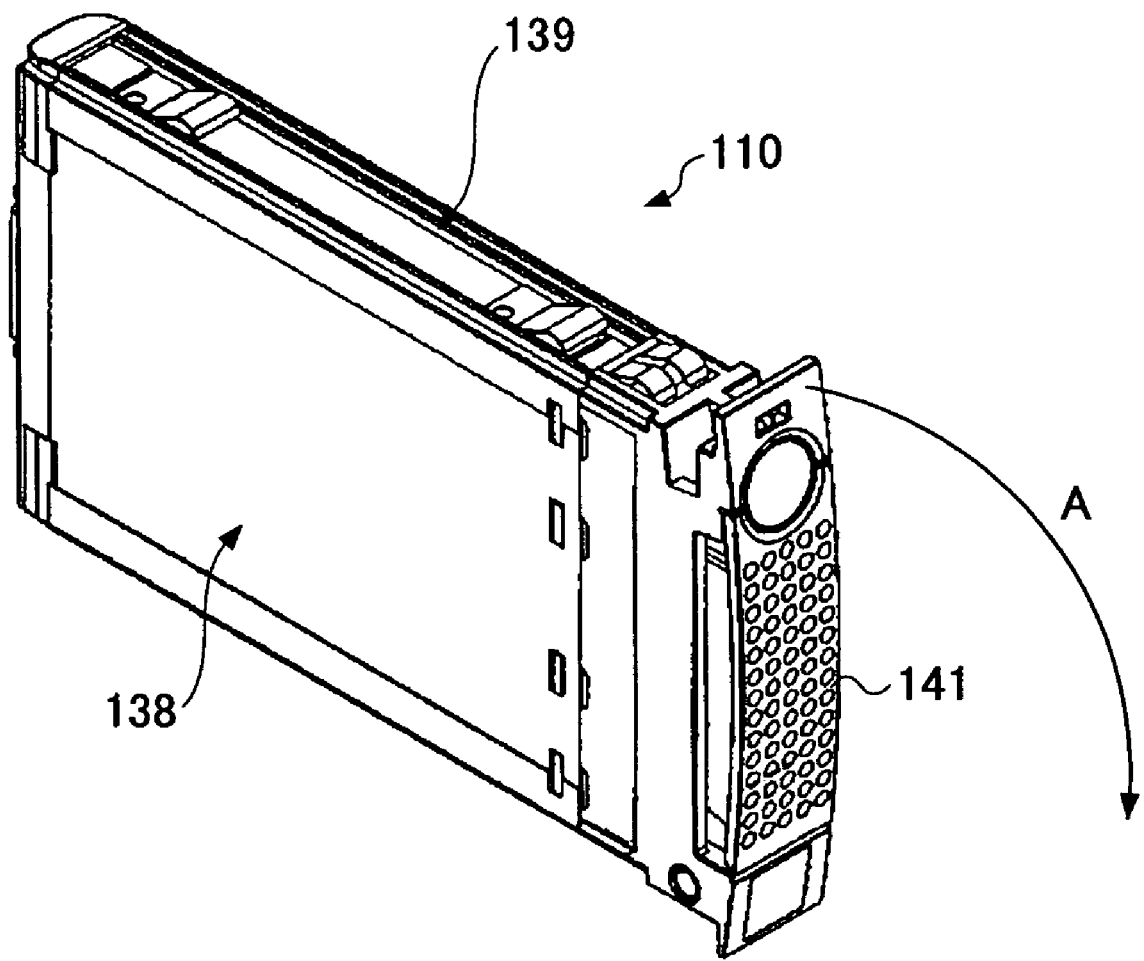
FIG. 2 is a perspective diagram showing the composition of the electronic unit which is loaded to the conventional disk array device.
Figure 3:
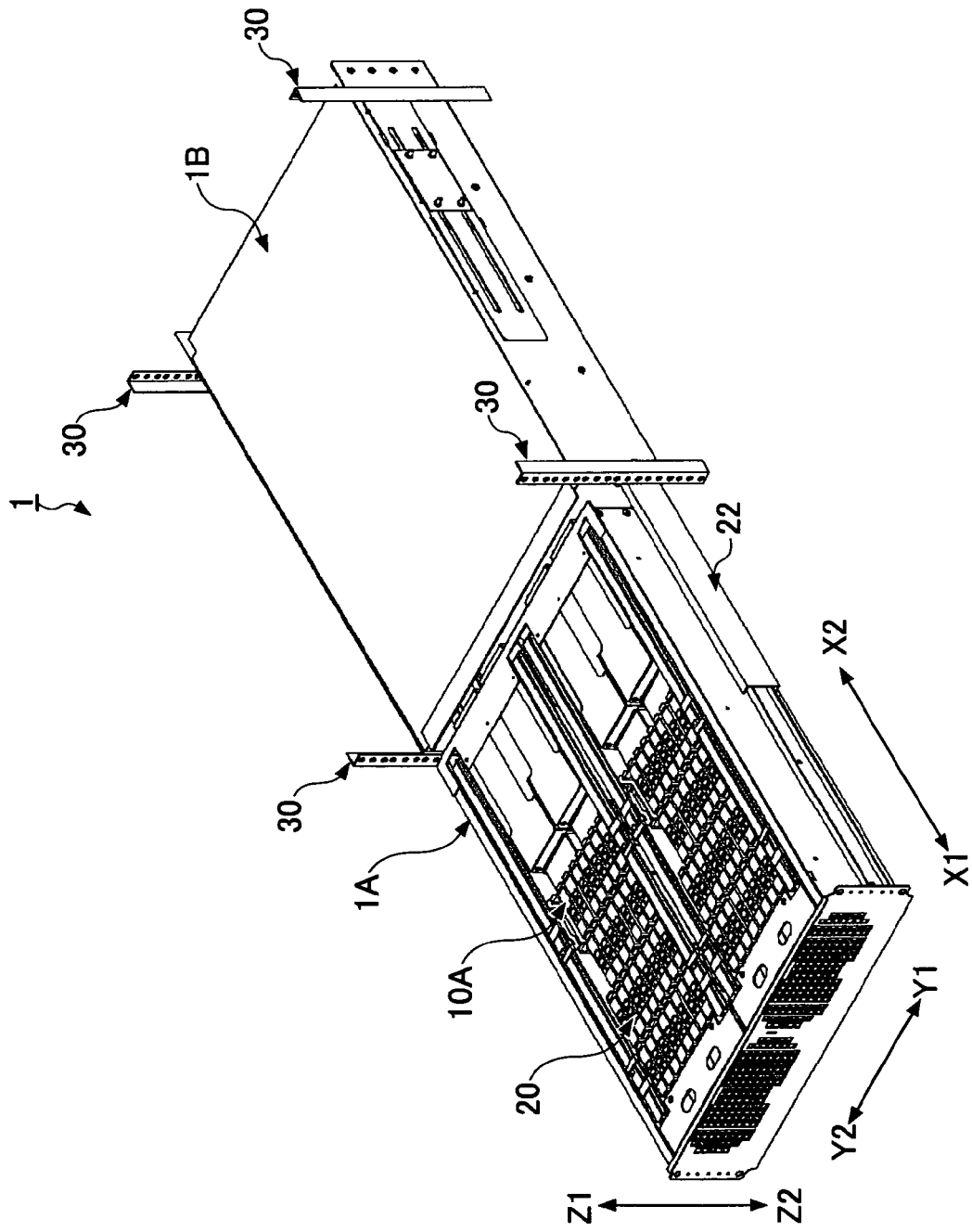
FIG. 3 is a perspective diagram showing the composition of the disk array device in one preferred embodiment of the invention.

FIG. 3 shows the composition of the disk array device 1 to which the electronic unit loading mechanism 10A (which will be called the loading mechanism 10A) in the first preferred embodiment of the invention is applied.

The disk array device 1 is the external storage of the large-sized computer, and this disk array device 1 is used to store the data. In this embodiment, the example in which the hard disk drive (HDD) 20 is used as the electronic unit will be explained. The HDD 20 is a hard disk drive which is miniaturized and uses the 2.5 inch diameter disks.

The disk array device 1 generally comprises the drawer cage 1A (which is equivalent to the electronic unit loading base), the device main part 1B, the loading mechanism 10A, etc. The drawer cage 1A can be taken out in the direction indicated by arrow X1 in FIG. 3 with the use of the rails 22 provided in the device main part 1B. Moreover, with the use of the rails 22, the drawer cage 1A can be loaded to the device main part 1B in the X2 direction of FIG. 3.

The device main part 1B has the housing configuration which is made to be in conformity with the standard dimensions, and the width thereof (indicated by the arrows Y1 and Y2 in FIG. 3) is made to be equal to 19 inches.

The device main part 1B is configured as the composition in which the device main part 1B is fixed by the four rack pillars 30. In addition, the composition in which only one disk array device 1 is arranged in the rack pillars 30 is illustrated in FIG. 3. Alternatively, two or more disk array devices 1 or other devices in conformity with the same standard specifications may be arranged in the rack pillars 30.

The plurality of the HDD 20 are loaded to the drawer cage 1A, and each HDD 20 is provided so that the HDD 20 can be attached to or detached from the cage 1A by using the loading mechanism 10A. The loading mechanism 10A is arranged such that there is almost no clearance to the drawer cage 1A, and, therefore, the plurality of the HDD 20 can be loaded to the drawer cage 1A with high density.

Moreover, when taking out the HDD 20 from the disk array device 1 for the maintenance etc., the drawer cage 1A is first pulled out from the device main part 1B, and then the HDD 20 is taken out from the cage 1A in the Z1 direction by using the loading mechanism 10A.

Next, the composition of the loading mechanism 10A will be explained with reference to FIG. 4 through FIG. 6B.

FIG. 4 through FIG. 6B are the enlarged diagrams showing the composition of the loading mechanism 10A. The loading mechanism 10A generally comprises the main part 2 and the holding member 3.

The main part 2 is configured so that the back-plate 23A and the side plates 23B are joined. The back-plate 23A functions as the bottom plate, and the connector 24 which is connected to the connector 17 (refer to FIG. 5B and FIG. 6B) provided in the HDD 20 is arranged on the back-plate 23A.

The side plates 23B are provided so that the back-plate 23A is interposed between the side plates 23B, and they are set up on the sides of the back-plate 23A.

Figure 6A:
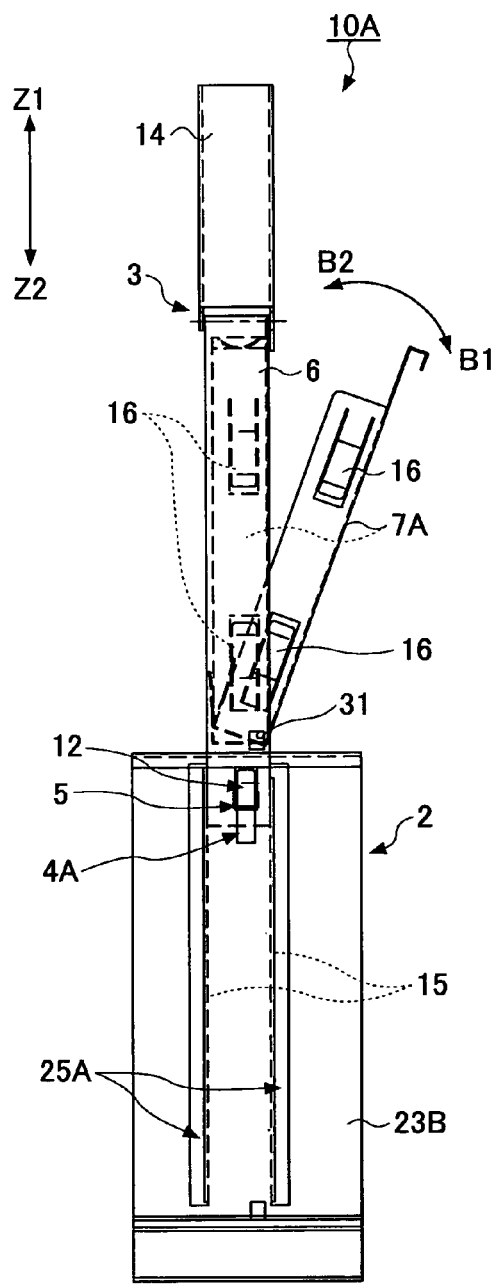
FIG. 6A and FIG. 6B are diagrams showing the state where the holding part of the loading mechanism of the first preferred embodiment is loaded.

The pair of the guides 15 which extend in the Z1 or Z2 direction of FIG. 6A are formed on each of the side plates 23B. The guides 15 are formed by turning a part of each side plate 23B made into the shape of a board inside and bending it, and, therefore, can be formed easily.

By turning the guides 15 inside and bending them, the slots are formed in each side plate 23B respectively. The slots function as the ventilating holes 25A, which will be explained below.

Furthermore, the holder closing portion 33 (see FIG. 8A) bent a little towards the outside is formed in the upper edge of each guide 15.

The pair of the guides 15 are formed on each side plate 23B so that they function to guide the movement of the holding member 3.

The distance (indicated by the arrow L1 in FIG. 4) of the guides 15 which are formed on each side plate 23B is made to be substantially equal to the width (indicated by the arrow L2 in FIG. 4) of the holding member 3. Therefore, movement of the holding member 3 in the Z1 or Z2 direction is guided by the guides 15.

Moreover, the stopper spring 4A and the fitting hole 12 are formed in the side plate 23B. The stopper spring 4A and the fitting hole 12 are disposed at the upper location between the guides 15 of each side plate 23B. For the sake of convenience of description, the stopper spring 4A and the fitting hole 12 will be explained later.

The holding member 3 generally comprises the frame 6, the holder 7A, and the handle 14. The frame 6 is provided so that it is movable in the vertical direction (the Z1 or Z2 direction) by using the guides 15 formed in the main part 2. Namely, the holding member 3 is vertically movable between the taken-out position (or the position shown in FIG. 4 and FIG. 5A) where the holding member 3 is taken out from the main part 2, and the loaded position (or the position shown in FIG. 6A) where the holding member 3 is loaded in the main part 2.

The frame 6 is provided with the back board 6A, and also provided with the holder 7A. The back board 6A serves as a closing member which closes the opening on one side of the frame 6. Moreover, the stopper hole 5 (refer to FIG. 8A) is formed near the bottom end region of the frame 6.

The holder 7A is the component in which the HDD 20 is attached or detached, and the holder 7A holds the HDD 20 in the loaded state. The holder 7A is provided so that it can be rocked relative to the frame 6 in the direction indicated by the arrow B1 or B2 around the pivot 31. Moreover, the projection 8 and the spring 16 are provided on the both sides of the holder 7A.

The holder 7A in this embodiment is formed into the integral part using the metal plate, and the projection 8 and the spring 16 are formed integrally with the holder 7A. The projection 8 is formed so that it projects outward, and the spring 16 is formed so that it projects inward (toward the side in which the HDD 20 is inserted).

Moreover, the recess 9 is formed at the position which corresponds to the position where the projection 8 is formed in the frame 6. Furthermore, the holder opening spring 32A which extends in the slanting direction towards the back board 6A is formed at the position which confronts the back board 6 of the holder 7A (refer to FIG. 8A).

The handle 14 is disposed in the upper part of the frame 6. The handle 14 is provided so that it is rotatable to the frame 6 in the direction indicated by the arrow D1 or D2 around the pivot 14a.

Moreover, the latching mechanism 13 which fixes the handle 14 to the position (called the latch position) when the handle 14 is rotated in the D1 direction and overlapped over the top surface of the frame 6 is formed in the upper part of the frame 6.

By operating the latching mechanism 13, the handle 14 is fixed to the latch position or the fixing of the handle 14 is canceled. The portion of the handle 14 which is extended from the pivot 14a is the grip portion which is held by the operator when pulling out the holding member 3 from the main part 2.

Figure 6B:
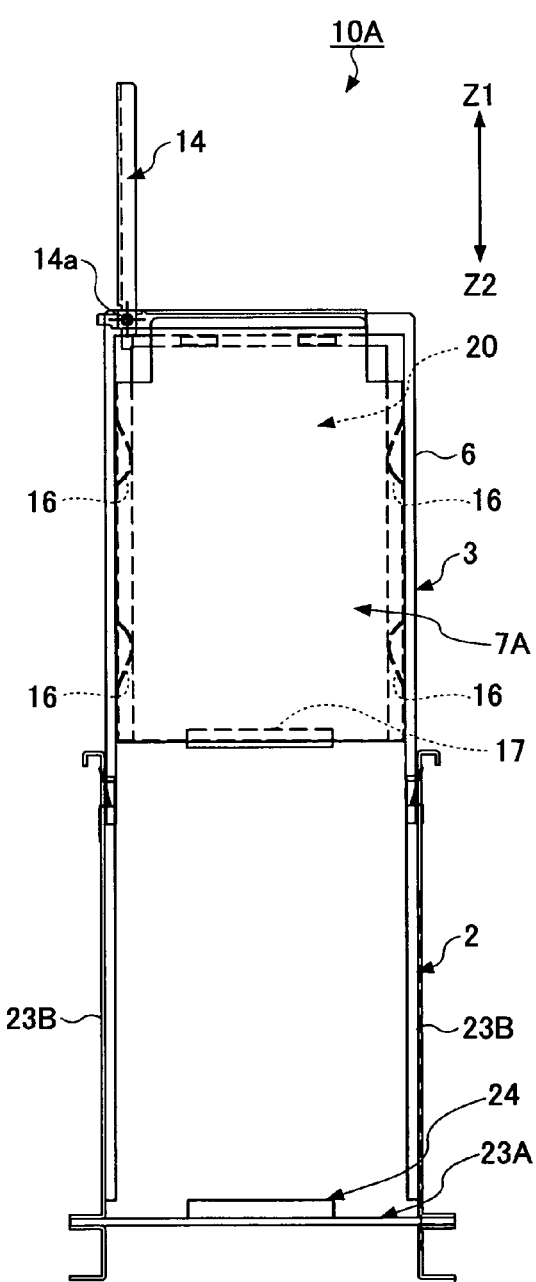

Moreover, the projection 11 is formed in the end portion of the handle 14 on the opposite side of the grip portion region with respect to the pivot 14a (refer to FIG. 6B and FIG. 9B). The projection 11 is engaged with the connection hole 12, provided in the main part 2, when the holding member 3 is in the loaded position and the handle 14 is latched. By this engagement, the main part 2 is fixed to the loaded position (refer to FIG. 9B).

Next, the operation of the loading mechanism 10A and the operation of attachment or detachment of the HDD 20 will be explained. In the following, the operation of loading the HDD 20 with the loading mechanism 10A in which the HDD 20 is not yet contained in the drawer cage 1A will be explained as an example of the operation.

In order to load the HDD 20 into the drawer cage 1A, the drawer cage 1A is first pulled out from the device main part 1B. FIG. 3 shows the state where the drawer cage 1A is pulled out from the device main part 1B.

When the drawer cage 1A is pulled out from the device main part 1B, all the plurality of the loading mechanisms 10A currently arranged in the drawer cage 1A are in the state where the holding member 3 is loaded in the main part 2, and each handle 14 is in the state where the handle 14 is latched to the latch position by the latching mechanism 13.

Then, in the state shown in FIG. 3, the latching mechanism 13 of the loading mechanism 10A in which the HDD 20 is to be loaded is operated, and the handle 14 is rotated in the D2 direction. Thereby, the engagement of the projection 11 and the connection hole 12 is canceled and the holding member 3 is set in the state where it can be moved in the vertical direction.

Next, the operator holds the grip region of the handle 14 and moves the holding member 3 upward (in the Z1 direction) with the handle 14.

The holding member 3 is raised while the position thereof is regulated according to this operation, and the movement of the frame 6 is guided by the guides 15 formed in the main part 2.

Figure 4:
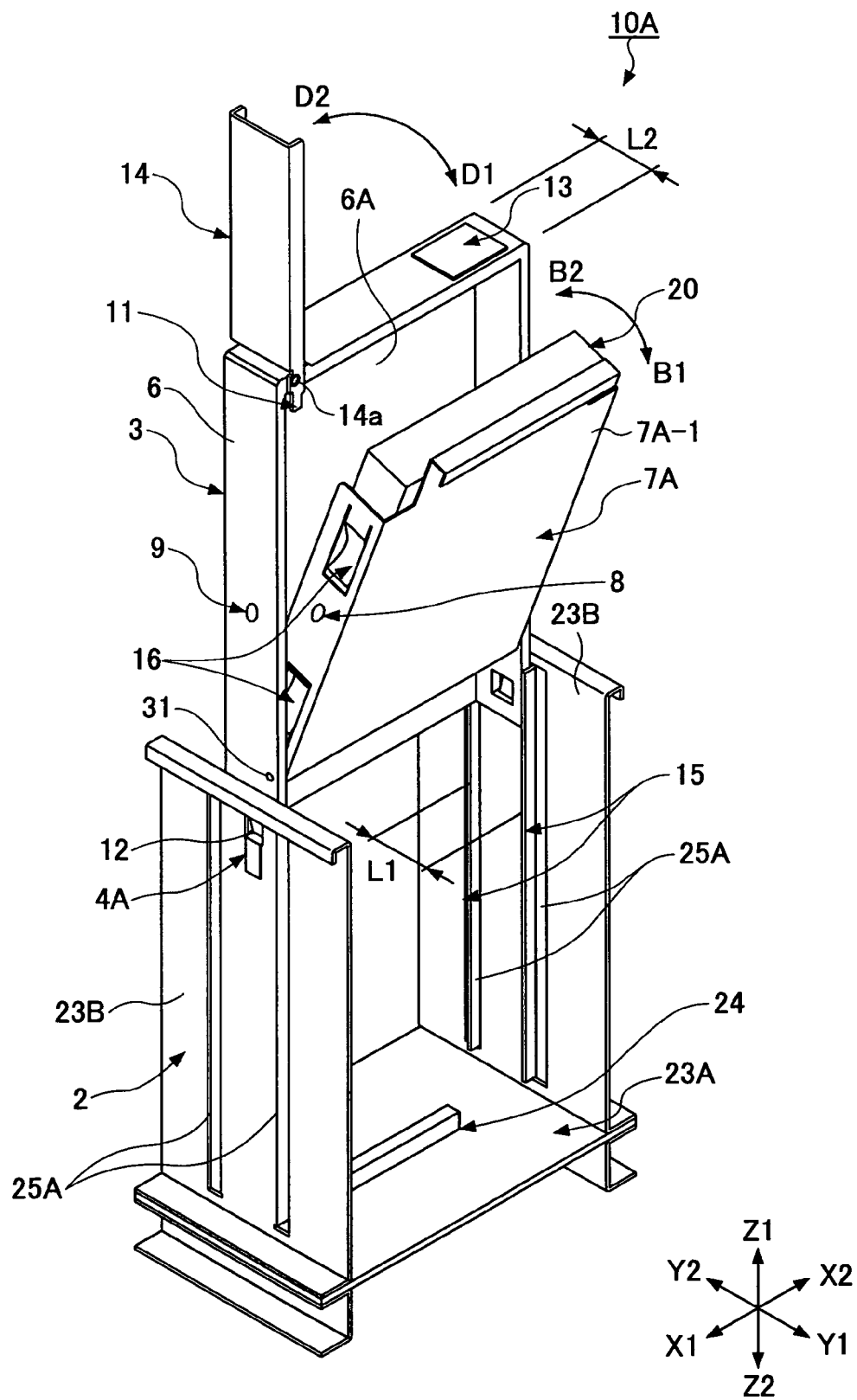
FIG. 4 is a perspective diagram showing the composition of the loading mechanism in the first preferred embodiment of the invention.

When the holding member 3 is moved to the taken-out position shown in FIG. 4 and FIG. 5A, the holder 7A provided in the holding member 3 is opened in the B1 direction automatically, and the holding member 3 is locked to the taken-out position.

Next, the mechanism in which the holder 7A is opened automatically when the holding member 3 is moved to the taken-out position will be explained.

As described above, the holder opening spring 32 is formed in the holder 7A, and the holder opening spring 32 is provided so that the elastic force may be energized in contact with the back board 6A (refer to FIG. 8A).

Moreover, the side regions of the back-surface 7A-1 (the outside surface in FIG. 4) of the holder 7A are configured so that they are engaged with the guides 15 formed in the above mentioned side plate 23B.

Therefore, when the back-surface 7A-1 of the holder 7A is engaged with the guides 15, the engagement of the back-surface 7A-1 and the guides 15 inhibits the rotation of the holder 7A as shown in FIG. 8B even if the holder opening spring 32 exerts the elastic force to push the holder 7A to the back board 6A.

Moreover, when the holder 7A is raised, the engagement of the back-surface 7A-1 and the guides 15 is canceled gradually. And when the predetermined engagement release position is reached, as shown in FIG. 8A, the holder 7A will be automatically opened in the B1 direction with the gravity of the holder 7A and the elastic force of the holder opening spring 32 to press the back board 6A. At this time, the engagement of the projection 8 and the recess 9 is also canceled.

In addition, when the holding member 3 is loaded to the main part 2, the back-surface 7A-1 is brought in contact with the holder closing portion 33 formed in the upper edge of the guides 15 with the lowering of the holder 7A (the frame 6), and the holder 7A is automatically closed by pressing the back-surface 7A-1 relative to the holder closing portion 33.

Next, the mechanism in which the holding member 3 is locked to the taken-out position when the holding member 3 is moved to the taken-out position will be explained.

As described above, the stopper hole 5 is formed at the position near the bottom edge of the holding member 3 (the frame 6), and the stopper spring 4A is disposed at the predetermined upper position of the main part 2. The formation position of the stopper spring 4A corresponds to the formation position of the stopper hole 5.

Namely, when the holding member 3 is raised relative to the main part 2 and moved to the predetermined taken-out position, the stopper hole 5 is engaged with the stopper spring 4A.

FIG. 7A shows the state where the stopper spring 4A is engaged with the stopper hole 5.

As shown in FIG. 7A, the locking portion 18A is formed so that it locks the holding member 3 to the main part 2 when the stopper spring 4A is engaged with the stopper hole 5.

The locking portion 18A is engaged with the stopper hole 5, and further movement of the holding member 3 in the Z1 direction is regulated. Thereby, it is possible to prevent the separation of the holding member 3 from the main part 2.

In this embodiment, the locking portion 18A is configured with the inclination which spreads in the outside exterior as it goes up. For this reason, when the engagement of the stopper spring 4A and the stopper hole 5 is canceled, in this embodiment, the operator performs the press-down operation of the holding member 3 to the main part 2 (in the Z2 direction).

With the inclination described above, the locking portion 18A is smoothly separated from the stopper hole 5, and, therefore, the holding member 3 will be in the state in which the holding member 3 can be lowered to the main part 2.

In addition, the configuration of the stopper spring is not limited to the configuration of the stopper spring 4A shown in FIG. 7A. Alternatively, the configuration of the stopper spring may be the configuration shown in FIG. 7B or FIG. 7C.

Unlike the stopper spring 4A, the stopper spring 4B shown in FIG. 7B or FIG. 7C is the convex configuration where the locking portion 18B does not have the inclination. Moreover, the operation portion 19 which is operated by the operator is formed in the upper edge of the stopper spring 4B.

In order to cancel the engagement of the locking portion 18B and the stopper hole 5, the operation portion 19 is moved in the direction indicated by the arrow C as shown in FIG. 7C. Thereby, the locking portion 18B is disengaged from the stopper hole 5.

The locking portion 18B has the convex configuration where it does not have the inclination, and according to this stopper spring 4B, the locking portion 18B is engaged with the stopper hole 5 firmly. For this reason, even if the external force is unexpectedly applied to the holding member 3 in the Z2 direction, it is possible to certainly prevent that the holding member 3 is moved to the loaded position.

As mentioned above, if it will be in the state where the holding member 3 projected, moved to the position, and the movement is locked, and the holder 7A opened to the frame 6, the operator will equip with the HDD 20 to the holder 7A.

The loading operation to the holding member 3 of the HDD 20 can recognize certainly the loaded position to the holder 7A, and since it is only the operation inserted as opposed to the holder 7A only, it can be performed easily.

Furthermore, the holder 7A the inner side turning projection the HDD 20 with which it is equipped since the spring 16 is formed the bottom the inside of the holder 7A, and there is no rattling.

Therefore, after carrying the HDD 20 in the disk array device 1 by the loading mechanism 10A, it can prevent that originate in the rattling in the holding member 3 and the malfunction occurs in the HDD 20.

After the loading of the HDD 20 to the holder 7A is completed, the operator holds the handle 14 and performs the lowering of the holding member 3 with the handle 14.

As described above, the locking portion 18A is disengaged from the stopper hole 5, and the locking by the stopper spring 4A is canceled, and the holding member 3 will be in the state which can move to the main part 2.

Moreover, in connection with the lowering of the holding member 3, the holder 7A is lidded in the direction of B-2 by being energized the holder closing portion 33, and thereby, the holder 7A will be in the state where it is loaded in the frame 6. The projection 8 engages with the recess 9 in this loaded state.

Moreover, if it is in this loaded state, the HDD 20 is in the state where it is pinched between back-surface 7A-1 of back board 6A and the holder 7A, and the HDD 20 has composition held in the holder 7A with the spring 16 as mentioned above.

For this reason, the HDD 20 can certainly be carried in the loading mechanism 10A.

By the way, the connector 17 provided in the HDD 20 where the holder 7A is equipped is comprised so that it may be located in the bottom (the Z2 direction side). Therefore, when the holding member 3 is lowered relative to the main part 2, the connector 17 of the HDD 20 contacts the connector 24 provided in the main part 2.

When the connector 17 and the connector 24 contact each other, the lowering of the holding member 3 is stopped. Then, from this state, the handle 14 is turned in the D1 direction, and rotation operation is carried out.

When the handle 14 rotates, the projection 11 also rotates. The engagement to which the projection 11 is formed in the main part region 2 it engages with the hole 12. When the handle 14 is rotated further from this state the handle 14 projection 11 and engagement the grip region in which the supporting point and the operator holds and presses the engagement position with the hole 12 is acted as a lever considered as the action in emphasis and pivot 14a.

For this reason, even if the operating physical force over the handle 14 is small, the force of the Z2 direction of acting on the holding member 3 becomes large, and, therefore, can insert the connector 17 in the connector 24 certainly.

Then, the handle 14 is latched by the latching mechanism 13, and the drawer cage 1A is loaded to the device main part 1B.

As mentioned above, the HDD 20 can be carried in the disk array device 1 by performing a series of operations. The loading mechanism 10A which starts this embodiment as mentioned above pulls out the holding member 3 in the vertical direction to the main part 2, and since it is the composition of equipping with the HDD 20 to the main part 2 in the taken-out position, it can perform easily loading processing to the disk array device 1 of the HDD 20.

Furthermore, in this embodiment, the holder 7A is provided in the holding member 3, and when the attaching or detaching of the HDD 20 to the holder 7A opened to the frame 6 is performed, the operator can recognize the loading position of the HDD 20 by viewing certainly, and, therefore, can perform loading operation of the HDD 20 with sufficient operability.

Next, the loading mechanisms 10B-10D in the second to fourth preferred embodiments of the invention will be explained with reference to FIG. 9A through FIG. 13.

In addition, in FIG. 9A through FIG. 13, the elements which are the same as corresponding elements of the first preferred embodiment in FIG. 3 through FIG. 8B are designated by the same reference numerals, and a description thereof will be omitted.

FIG. 9A and FIG. 9B show the loading mechanism 10B in the second preferred embodiment of the invention.

As for the loading mechanism 10A in the first preferred embodiment, the ventilating hole 25A is formed only in the guide 15 formation position of the side plate 23B.

On the other hand, in this embodiment, the ventilating hole 25B is formed also in the holder 7B which contains the HDD 20 (refer to FIG. 9B). Thus, the efficiency of cooling the HDD 20 can be raised by forming the ventilating hole 25B directly in the holder 7B to which the HDD 20 is loaded.

In addition, the formation position of the direct ventilating hole is good also as composition which it is not limited to the holder 7B and side plate 23B, and is formed in back board 6A of the holding member 3.

FIG. 10A and FIG. 10B show the loading mechanism 10C in the third preferred embodiment of the invention.

In the loading mechanism 10A of the first preferred embodiment, when the holding member 3 is moved to the loaded position in the main part 2 after the HDD 20 is loaded to the holding member 3, the connector 17 and the connector 24 contact each other.

However, when the holding member 3 is strongly pressed in the Z2 direction, there is a possibility that the connector 17 and the connector 24 may impact strongly and may be damaged.

On the other hand, in this embodiment, the shock absorbing member 34 is disposed on the top surface of the back-plate 23A or the undersurface of the holder 7A. The height of the shock absorbing member 34 is set to be larger than the total height of the connectors 17 and 24 when the connector 17 and the connector 24 contact each other.

Therefore, when the holding member 3 is moved to the loaded position, before the connector 17 and the connector 24 contact each other, the shock absorbing member 34 is first in contact with the base of the back-plate 23A or the holder 7A and serves to absorb the shock. It is possible to prevent that the connectors 17 and 4 are impacted strongly and are damaged.

In addition, the shock absorbing member 34 may be made of the elastic material, such as a flat spring, a coil spring, or a shock absorbing rubber.

Figure 11:
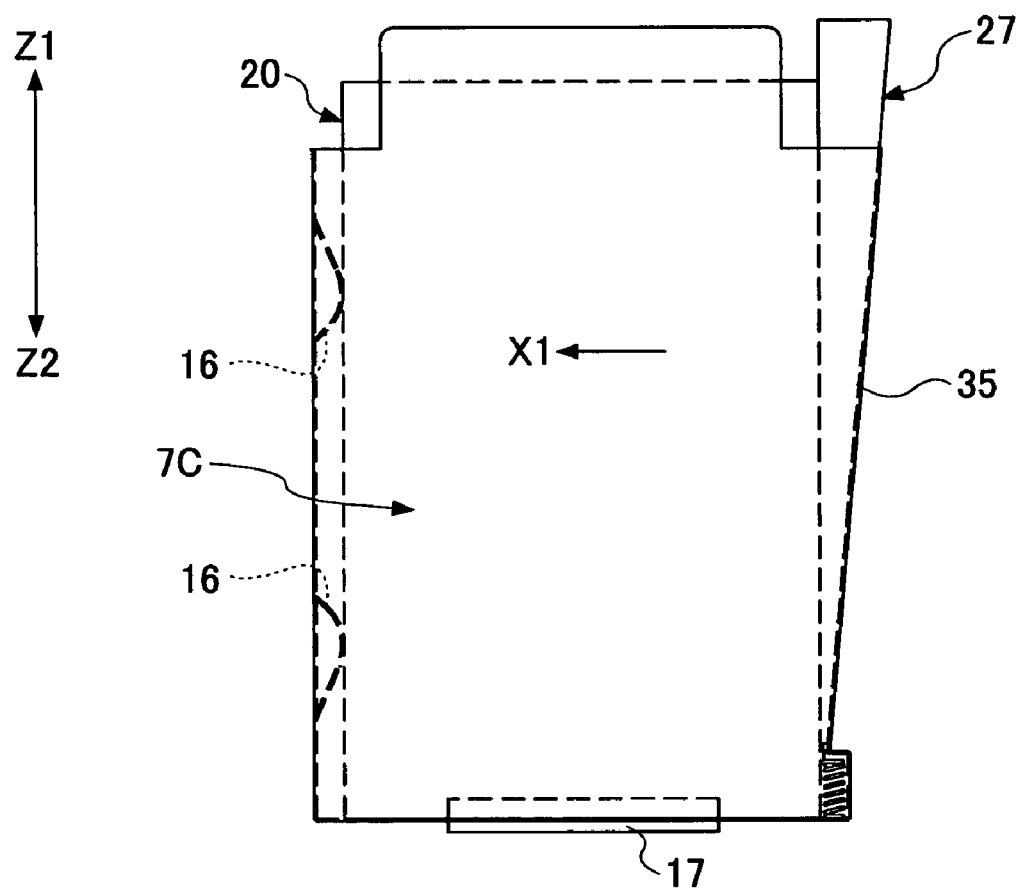
FIG. 11 is a diagram showing the holder provided in the loading mechanism in the fourth preferred embodiment of the invention.
Figure 13:
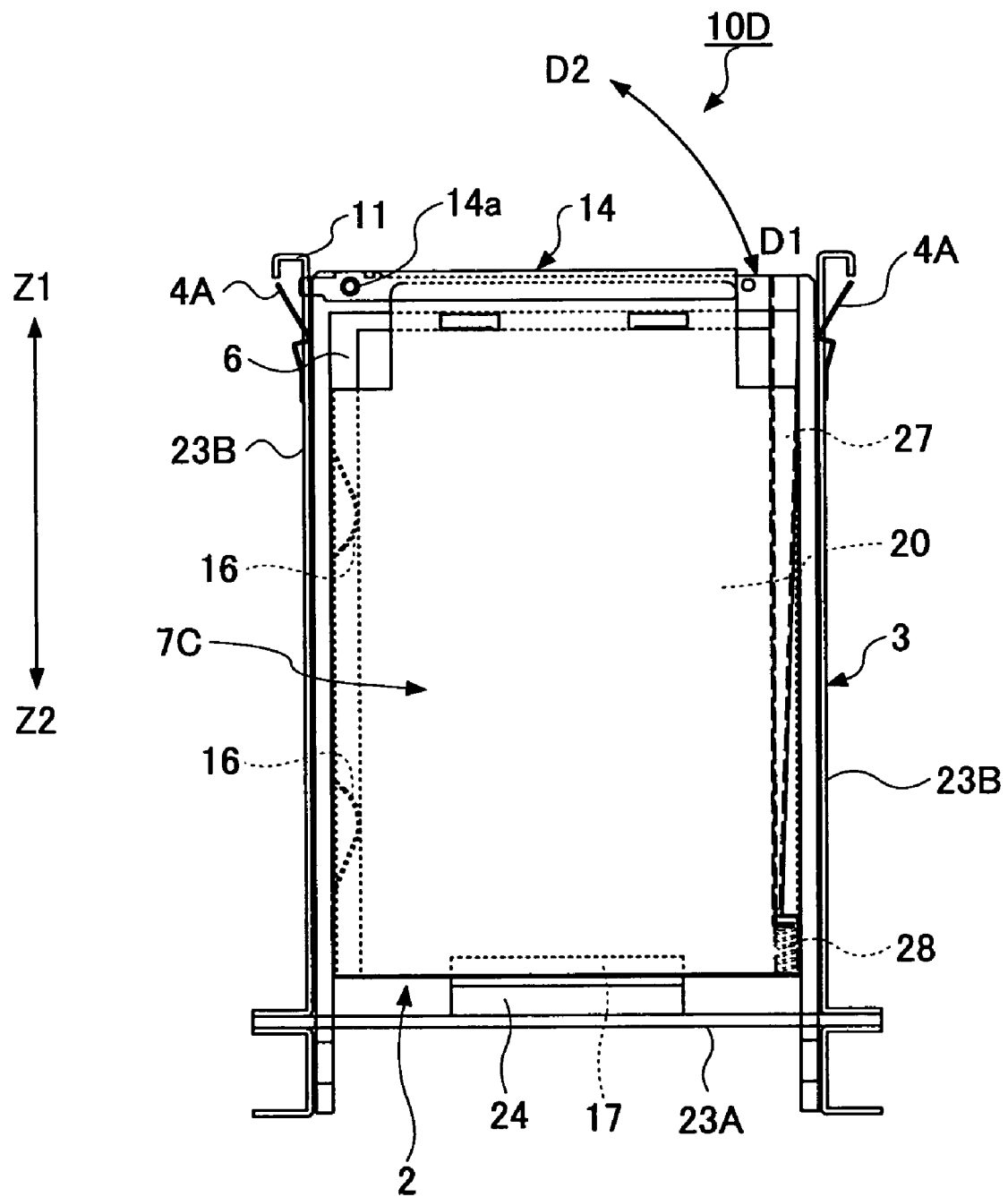
FIG. 13 is the front view showing the state where the holding part of the loading mechanism of the fourth preferred embodiment is loaded.

FIG. 11 through FIG. 13 show the composition of the loading mechanism 10D in the fourth preferred embodiment of the invention.

As previously mentioned, the loading mechanism 10A of the first preferred embodiment is configured so that only the spring 16 is disposed in order to prevent the rattling of the HDD 20 in the holder 7A.

By forming the spring 16, it is possible to prevent the rattling of the HDD 20 in the holder 7A to some degree. However, when a large external force is applied, the spring 16 is subjected to elastic deformation, and there still is a possibility that the malfunction of the HDD 20 occurs.

To obviate the problem, the loading mechanism 10D of this embodiment is configured so that the slanting portion 35 is formed on the side surface of the holder 7C, and the slider 27 is disposed in the slanting portion 35.

The slider 27 has the wedge-shaped configuration, and therefore, as shown in FIG. 11, the HDD 20 can be pushed in the direction indicated by the arrow X1 by inserting the slider 27 in the slanting portion 35 in the Z2 direction in the state where the HDD 20 is loaded to the holder 7C.

Thereby, the HDD 20 is pushed on the side surface which is different from the side surface in which the slanting portion 35 is formed, and it is possible to prevent the occurrence of the rattling of the HDD 20 more certainly. Therefore, the occurrence of the malfunction of the HDD 20 can be suppressed more certainly.

FIG. 12A shows the state where the holding member 3 is locate at the taken-out position in the loading mechanism 10D of this embodiment, and the handle 14 is rotated in the D2 direction to the opened position.

Moreover, in the loading mechanism 10D, as shown in FIG. 12C, the spring 28 is disposed in the lower part of the slider 27. Moreover, the slider 27 is pushed in the arrow Z1 direction by the spring 28, and therefore, the Z1 direction edge of the slider 27 projects from the top surface of the frame 6 as shown in FIG. 12B.

In addition, FIG. 12B is an enlarged view of the portion indicated by the arrow A in FIG. 12A, and FIG. 12C is an enlarged view of the portion indicated by the arrow B in FIG. 12A.

As shown in FIG. 12A, when the slider 27 is moved in the Z1 direction, the distance between the slider 27 and the other side surface of the holder 7C is larger than the width of the HDD 20, and the HDD 20 can be attached to or detached from the holder 7C with sufficient operability.

In addition, FIG. 12A shows the state where the HDD 20 is loaded to the holder 7C. If the handle 14 is operated in the state shown in FIG. 12A, the holding member 3 is loaded in the main part 2. Next, if the handle 14 is closed in the D1 direction, the handle 14 is brought into contact with the slider 27 which is projecting from the frame 6, so that the slider 27 is pressed down in the Z2 direction.

FIG. 13 shows the state where the handle 14 presses the slider 27. By the pressing force of the handle 14, the slider 27 is moved in the Z2 direction against the elastic force of the spring 28, and, thereby, the HDD 20 is pressed towards the side surface which is different from the side surface in which the slider 27 is disposed. The HDD 20 is pressed in the X1 direction.

As described above, since the handle 14 is latched by the latching mechanism 13, while the latched state is maintained, the slider 27 is maintained in the state where the HDD 20 is pressed towards the side surface different from the side surface of the slider 27.

Therefore, the rattling of the HDD 20 in the holder 7C is prevented certainly, and according to the loading mechanism 10D of this embodiment, it is possible to prevent the malfunction of the HDD 20 more certainly.

In addition, in order to take out the HDD 20 from the loading mechanism 10D, the handle 14 is rotated in the D2 direction, and the pressing force of the slider 27 is canceled. The slider 27 is moved in the Z1 direction automatically according to the elastic force of the spring 28, and the pressing force to the HDD 20 in the X1 direction is also canceled.

Therefore, after canceling the latching of the handle 14, the HDD 20 can be easily attached to or detached from the holder 7C.

The present invention is not limited to the above-described embodiments, and variations and modifications may be made without departing from the scope of the present invention.

What is claimed is:

1. An electronic unit loading mechanism in which an electronic unit is attachable to or detachable from an electronic unit loading base which is retractable to a housing, the electronic unit loading mechanism comprising:
   a main part fixed to the loading base;
   a holding part holding the electronic unit;
   one or more first ventilation holes disposed in side plates of the main part; and
   one or more second ventilation holes disposed in the holding part,
   wherein the holding part is vertically movable with respect to the main part between a taken-out position and a loaded position, wherein the holding part at the taken-out position is taken out from the main part so that the electronic unit is attached to or detached from the loading base, and the holding part at the loaded position is contained in the main part so that the electronic unit is loaded to the loading base, and
   wherein the first ventilation holes and the second ventilation holes are cooling air passages of a cooling air used for cooling the electronic unit when the holding part is contained in the main part at the loaded position.

2. The electronic unit loading mechanism according to claim 1 further comprising a movement regulating member which regulates movement of the holding part when the holding part is moved from the loaded position to the taken-out position.

3. The electronic unit loading mechanism according to claim 1 further comprising a locking member which locks the electronic unit to the holding part when the electronic unit is loaded to the holding part.

4. The electronic unit loading mechanism according to claim 1 further comprising a shock absorbing member which absorbs impact between the holding part and the main part when the holding part is loaded into the main part.

5. The electronic unit loading mechanism according to claim 1 wherein the holding part comprises a frame and a holder, the frame being vertically movable to the main part, the holder being retractable to the frame, and the electronic unit being attachable to or detachable from the holder.

6. The electronic unit loading mechanism according to claim 5 further comprising an opening member which forces the holder to be opened from the frame when the holding part is moved to the taken-out position from the loaded position.

7. The electronic unit loading mechanism according to claim 5 further comprising a closing member which forces the holder to be closed to the frame when the holding part is moved to the loaded position from the taken-out position.

8. The electronic unit loading mechanism according to claim 1 wherein a guide part is formed in the main part to guide movement of the holding part, and the one or more first ventilation holes are formed together with the guide part.

9. A disk array device including a housing, a disk unit loading base retractable to the housing, and a loading mechanism in which disk units are attachable to or detachable from the loading base, the loading mechanism comprising:
   a main part fixed to the loading base;
   a holding part holding the disk units;
   one or more first ventilation holes disposed in side plates of the main part; and
   one or more second ventilation holes disposed in the holding part,
   wherein the holding part is vertically movable to the main part between a taken-out position and a loaded position, wherein the holding part at the taken-out position is taken out from the main part so that the disk units are attached to or detached from the loading base, and the holding part at the loaded position is contained in the main part so that the disk units are loaded into the loading base,
   wherein the first ventilation holes and the second ventilation holes are cooling air passages of a cooling air used for cooling the electronic unit when the holding part is contained in the main part at the loaded position.

10. The disk array device according to claim 9 wherein the loading mechanism further comprises a movement regulating member which regulates movement of the holding part when the holding part is moved from the loaded position to the taken-out position.

11. The disk array device according to claim 9 wherein the loading mechanism further comprises a locking member which locks the disk units to the holding part when the disk units are loaded to the holding part.

12. The disk array device according to claim 9 wherein the loading mechanism further comprises a shock absorbing member which absorbs impact between the holding part and the main part when the holding part is loaded into the main part.

13. The disk array device according to claim 9 wherein the holding part comprises a frame and a holder, the frame being vertically movable to the main part, the holder being retractable to the frame, and the disk units being attachable to or detachable from the holder.

14. The disk array device according to claim 13 wherein the loading mechanism further comprising an opening member which forces the holder to be opened from the frame when the holding part is moved to the taken-out position from the loaded position.

15. The disk array device according to claim 13 wherein the loading mechanism further comprises a closing member which forces the holder to be closed to the frame when the holding part is moved to the loaded position from the taken-out position.

16. The disk array device according to claim 9 wherein a guide part is formed in the main part to guide movement of the holding part, and the one or more first ventilation holes are formed together with the guide part.

17. An electronic unit loading mechanism in which an electronic unit is attachable to or detachable from an electronic unit loading base that is retractable to a housing, the electronic unit loading mechanism comprising:
  a main part fixed to the loading base;
  a holding part holding the electronic unit and being configured to move between a taken-out position with respect to the main part and a loaded position within the main part;
  one or more first ventilation holes disposed in side plates of the main part;
  one or more second ventilation holes disposed in the holding part, and
  one or more cooling air passages formed by the one or more first ventilation holes and the one or more second ventilation holes, the one or more cooling air passages passing a cooling air that is used for cooling the electronic unit when the holding part is contained in the main part in a loaded position.

18. The electronic unit loading mechanism according to claim 1, wherein the holding part includes a frame and a holder, the frame being vertically movable with respect to the main part, the holder being placed into the frame at the loaded position.

19. The electronic unit loading mechanism according to claim 18, wherein the holder is configured to be rocked relative to the frame.

* * * * *